(12) United States Patent
Jain et al.

(10) Patent No.: US 7,873,735 B2
(45) Date of Patent: Jan. 18, 2011

(54) METHOD AND APPARATUS TO TERMINATE DIAL-UP CONNECTIONS ON MOBILE DEVICES

(75) Inventors: Kuldeep Jain, San Diego, CA (US); Jianhao Michael Yang, San Diego, CA (US); Krishna Kumar, San Diego, CA (US)

(73) Assignee: Nokia Corporation, Espoo (FI)

( * ) Notice: Subject to any disclaimer, the term of this patent is extended or adjusted under 35 U.S.C. 154(b) by 639 days.

(21) Appl. No.: 10/761,849

(22) Filed: Jan. 20, 2004

(65) Prior Publication Data

US 2005/0160173 A1    Jul. 21, 2005

(51) Int. Cl.
G06F 15/16    (2006.01)
(52) U.S. Cl. .................. 709/227; 709/228; 709/201
(58) Field of Classification Search ............. 709/227, 709/228
See application file for complete search history.

(56) References Cited

U.S. PATENT DOCUMENTS

| | | | | |
|---|---|---|---|---|
| 5,983,090 | A * | 11/1999 | Aoki ........................... | 455/403 |
| 6,192,041 | B1 * | 2/2001 | Phillips ...................... | 370/338 |
| 6,230,024 | B1 * | 5/2001 | Wang et al. ................. | 455/557 |
| 6,349,224 | B1 * | 2/2002 | Lim ............................ | 455/466 |
| 6,370,399 | B1 * | 4/2002 | Phillips ...................... | 455/564 |
| 6,487,406 | B1 * | 11/2002 | Chang et al. ............. | 455/422.1 |
| 6,570,782 | B1 * | 5/2003 | Brandenberger et al. .... | 365/100 |
| 6,651,105 | B1 * | 11/2003 | Bhagwat et al. ............. | 709/239 |
| 6,768,726 | B2 * | 7/2004 | Dorenbosch et al. ........ | 370/331 |
| 7,055,056 | B2 * | 5/2006 | Bessire .......................... | 714/6 |
| 7,206,574 | B2 * | 4/2007 | Bright et al. ............. | 455/426.1 |
| 7,269,165 | B2 * | 9/2007 | Karino ....................... | 370/352 |
| 2003/0041119 | A1 * | 2/2003 | Bisdikian et al. ........... | 709/219 |
| 2003/0100321 | A1 * | 5/2003 | Rao et al. .................... | 455/466 |
| 2003/0212822 | A1 * | 11/2003 | Saha et al. .................. | 709/245 |
| 2004/0022212 | A1 * | 2/2004 | Chowdhury et al. ........ | 370/329 |
| 2004/0204069 | A1 * | 10/2004 | Cui et al. .................... | 455/557 |
| 2005/0117590 | A1 * | 6/2005 | Ronneke ................ | 370/395.52 |

OTHER PUBLICATIONS

CDMA AT Commands Interface Specification, Version 1.70, Feb. 26, 2003, WM_SW_CDMA_AT_001, p. 1, 161 and 162 of 218.

* cited by examiner

Primary Examiner—John Follansbee
Assistant Examiner—Dhairya A Patel
(74) Attorney, Agent, or Firm—Harrington & Smith

(57) ABSTRACT

Disclosed is a method and apparatus to provide an IP connection between a mobile station (MS 10) and a computing device (CD 12). The method includes initiating the set up of the IP connection with a command sent from the CD to the MS over a local interface (13) and, in response to receiving over the local interface an IP message at the MS from the CD, routing the received IP message to an application that is resident in the MS. 2. In a presently preferred first embodiment the command is an AT command, more specifically an AT+CRM command having a value of five. In a presently preferred second embodiment the command places the MS into an auto-answer mode, and is an ATSO=1 command.

33 Claims, 3 Drawing Sheets

METHOD AND APPARATUS TO TERMINATE DIAL-UP CONNECTIONS ON MOBILE DEVICES

TECHNICAL FIELD

This invention relates generally to wireless connectivity between a mobile device or mobile station and a network using Internet Protocol (IP) messaging and, more specifically, relates to establishing an IP connection between a mobile station and a computing device.

BACKGROUND

In wireless networks, IP connectivity is provided to a mobile station (MS) by the use of at least two modes of operation. The first mode of operation can be referred to as a Browser or Internal Mode, where a connection is initiated from the MS. In this mode, and by example, a browser or mini-browser that runs in the MS can initiate a TCP/IP connection to access the Internet. In a second mode of operation, also referred to as a Relay Mode, the MS is used as a dial-up wireless modem to provide IP connectivity to a computing device, such as a desktop or laptop computer.

In the Internal Mode those applications resident on the MS, such as the mini-browser, communicate with the Internet over-the-air, while in the Relay Mode the IP traffic from the computing device is transparently relayed by the MS to a bearer (e.g., a code division, multiple access (CDMA) or a global system for mobile communication (GSM)/general packet radio system (GPRS) radio bearer).

However, no standard technique is known to currently exist by which the computing device can establish an IP connection with applications residing on the MS, for example with a PIM (Personal Information Management) application, without using a cellular network. As can be appreciated, in some applications it may be less than desirable to use the cellular network for making an IP connection between a MS and a local computing device, such as a laptop computer in one's home or office.

Thus, while standards, procedures and protocols are currently in place for enabling an application that resides on the MS to connect to an application that resides on a computing device over the cellular network, such as a CDMA or GPRS network in the Internal Mode of operation, no standard technique of communication over a short-haul interface, such as a USB, or a Serial IR (short range infrared) or a Bluetooth™ (low power, short range RF) interface, is currently available.

While one might attempt to circumvent this problem by writing special device drivers that would plug-in as, for example, USB, Serial IR, or Bluetooth™ IP interfaces into the computing device's Operating System (OS), this approach would require developing, supporting, installing and possibly uninstalling device drivers for several different computing device architectures.

Prior to this invention, there was no satisfactory solution to the problem that arises when a computing device desires to communicate with an application resident on a MS using IP-based protocols over a medium other than the cellular network.

SUMMARY OF THE PREFERRED EMBODIMENTS

The foregoing and other problems are overcome, and other advantages are realized, in accordance with the presently preferred embodiments of these teachings.

An aspect of this invention concerns making a direct IP connection between a computing device and a MS using IP-based protocols, without involving a cellular network. Another aspect of this invention concerns terminating an IP connection on the MS, rather than using the MS simply as a connection medium, such as a wireless modem. A further aspect of this invention involves making communication possible between peer-to-peer (P2P) applications on the MS and a computing device, without requiring installation of new device drivers or software on the computing device.

In one aspect this invention provides a method to provide an IP connection between a MS and a CD, and includes initiating the set up of the IP connection with a command sent from the CD to the MS over a local interface and, in response to receiving over the local interface an IP message at the MS from the CD, routing the received IP message to an application that is resident in the MS.

In another aspect this invention provides a computer program stored in a computer readable medium within a MS to provide an IP connection between the MS and a CD. The computer program includes first computer program code that is responsive to a receipt of a command from the CD over a local interface to initiate the set up of the IP connection; and further includes second computer program code that is responsive to receiving over the local interface an IP message from the CD, to route the received IP message to an application that is resident in the MS.

A MS that includes means for implementing the method and the computer program is also disclosed.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
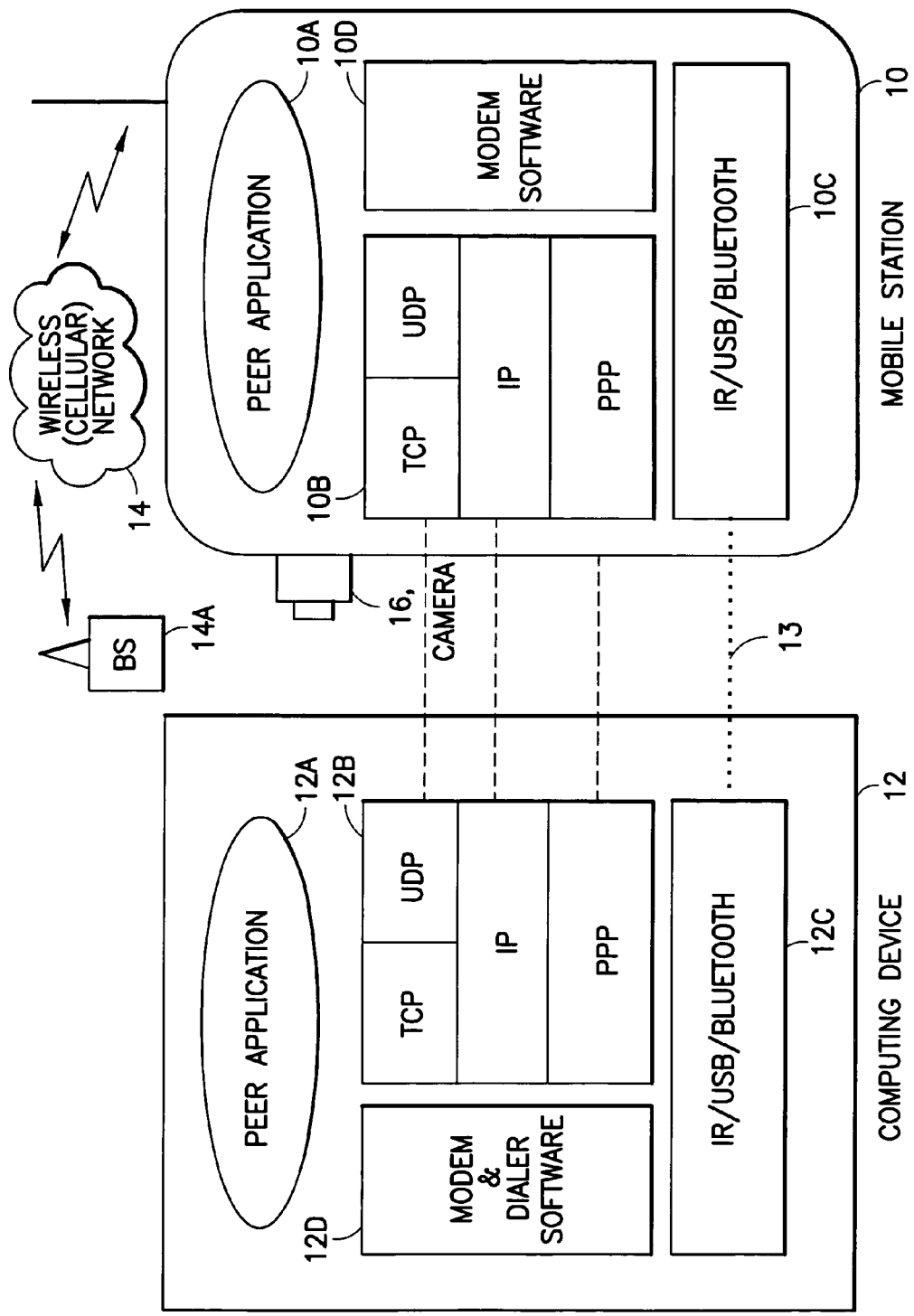
FIG. 1 illustrates a protocol stack and applications on a MS and a Computing Device (CD)

FIG. 1 shows a Protocol Stack and Applications on a MS 10 and a CD 12. The MS 10 may be, as examples, a cellular telephone, or a personal data assistant (PDA), or a personal organizer, or a handheld computing device, or it may contain a combination of two or more of these functions. The CD 12 could be a laptop or a desktop computer, a handheld computer, or any device having computing capabilities. The MS 10 and CD 12 are assumed to each include a local data processor coupled to a memory that stores at least one peer application 10A, 12A; a protocol stack 10B, 12B containing TCP, UDP IP and Point-to-Point Protocol (PPP) protocols; at least one of an IR/USB and/or Bluetooth™ interface and drivers 10C, 12C connected through a wired or a wireless local interface 13; and in the MS 10 a modem software module 10D, while in the CD 12 a modem and dialer software module 12D. The connections between the protocol stacks 10B, 12B are assumed to be logical connections that are actually made via, in accordance with this invention, the local interface 13. Also shown for completeness in FIG. 1 is a wireless connection between the MS 10 and a base station (BS) 14A of a wireless (cellular) network 14, such as a CDMA network Note that the MS 10 may include a camera 16 that is suitable for generating image data, such as photographs and/or video clips.

The memory of the MS 10 also stores a computer program for implementing this invention, as will be described below in relation to FIGS. 2 and 3. It is a feature of this invention that the software of the CD 12 need not be modified to work with the MS 10 that operates in accordance with this invention.

This invention is disclosed below in the context of a dial-up mode for the MS 10 that can be referred to as a "Terminating Dial-up Mode". As the name indicates, this mode provides a capability to the MS 10 to locally terminate (form one end of) a dial-up connection from the CD 12, rather than to bypass or merely relay such a connection to a wireless bearer, such as the cellular network 14 shown in FIG. 1. An extension to the AT command set is presently preferred for this purpose, although the invention is not limited to only the use of the AT command set.

In a CDMA wireless network 14 the extension can be provided in an AT command "+CRM" (set $R_m$ interface protocol). The +CRM command is specified in TIA/EIA-IS707.3, and the command syntax is: AT+CRM=<Val>. As currently specified <Val> can have a value in the range of 0 to 4 for configuring the MS 10 into one of the following modes using the +CRM command.

<Val> Mode
0 Asynchronous Data or Fax
1 Packet data service, Relay Layer $R_m$ interface
2 Packet data service, Network Layer $R_m$ interface, PPP
3 Packet data service, Network Layer $R_m$ interface, SLIP
4 STU-III Service In the presently preferred embodiment of this invention the new, extended command AT+CRM=5 is interpreted by the MS 10 as a command to place the MS 10 into the "Terminating Dial-up Mode" of operation. The invention enables an end user to configure the MS 10 for terminating connections, and to subsequently connect to the MS 10 from the CD 12 by dialing the AT+CRM=5 command from conventional dialer software 12D. During this process the CD 12 functions in a conventional manner as though it were connected to a modem, while the MS 10 effectively functions as a combination of both a modem and an end device. No new drivers or other software are required by the CD 12 to operate with a MS 10 in the "Terminating Dial-up Mode" of operation, and all components of the CD 12 may remain unchanged from those found in a conventional CD 12.

The modem software 10D of the MS 10 is preferably modified to correctly interpret the extended AT+CRM=5 command, i.e., the "Terminating Dial-up Mode" command, so as to configure the resident IP protocol stack 10B to route received packets to local applications, such as to the peer application 10A.

The operation of terminating the connection at the MS 10 can be performed in one of at least two modes. A first approach is via a CD 12 initiated connection, as depicted in FIG. 2, while a second approach is via a MS 10 initiated connection, as depicted in FIG. 3. It is assumed that the commands and messages depicted in FIGS. 2 and 3 flow over the local interface 13 between the IR/USB/Bluetooth™ interfaces 10C, 12C of FIG. 1.

Figure 2:
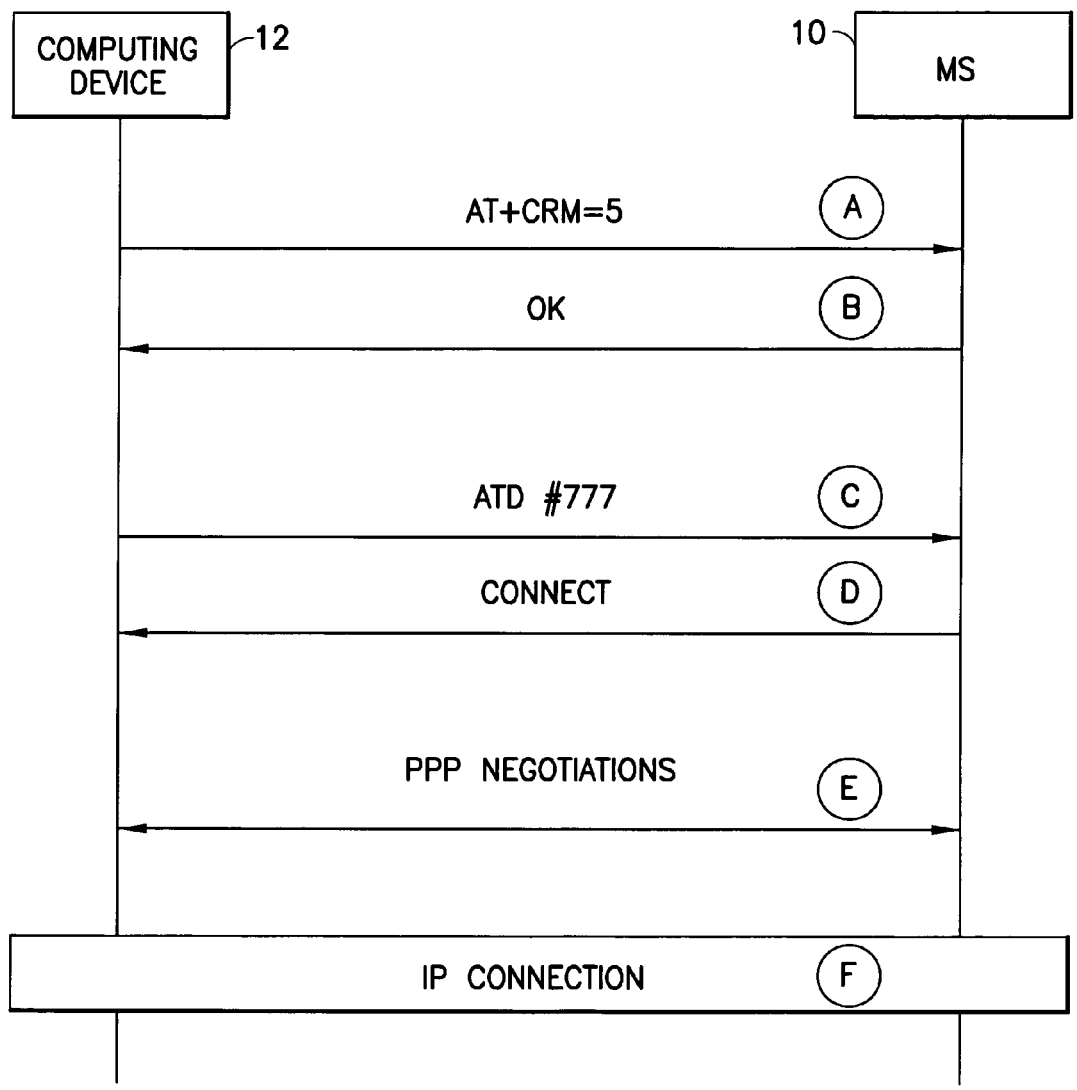
FIG. 2 illustrates message flow during a CD-initiated connection.

In FIG. 2 the CD 12 at Step A sends the new, extended AT command AT+CRM=5 to the MS 10 through the dialer software 12D and via the local interface 13. This is an indication to the MS 10 that the CD 12 desires to establish a terminating connection. At Step B it is assumed that the MS 10 responds back to the CD 12 with an OK. At Step C the CD 12 sends a conventional ATD #777 sequence to establish a call, and a Step D the MS 10 responds back with a CONNECT indication. At Step E any necessary PPP negotiations occur between the MS 10 and the CD 12, and at Step F the IP connection is established. During the Step E and F processes the MS 10 assigns some arbitrary IP address, for example 10.0.0.1, to the CD 12 and some other arbitrary IP address, for example 10.0.0.2, to itself. The MS 10 also configures its resident IP protocol stack to route incoming IP packets to the local application(s), such as the peer application 10A. Also, the dialer software 12D of the CD 12 adds an IP interface to the OS of the CD 12. This is similar to normal dial-up connections where dialer software adds a PPP interface to the operating system of the CD after a successful authentication from an ISP (Internet Service provider). Communication subsequently occurs between the peer applications 10A, 12A using the local, short range IR/USB/Bluetooth™ interface 10C, 12C.

In the second mode referred to above the MS 10 is enabled to initiate the dial-up connection, for example to synchronize data with the CD 12 based on user preferences, such as every morning, or whenever the MS 10 connects the CD 12. Referring to FIG. 3, at Step A the CD 12 sets the MS 10 into an auto-answer mode by sending an ATS0=1 command sequence to the MS 10, to which the MS 10 responds with an OK (Step B). At some point the MS 10 receives a trigger signal, such as one from the peer application 10A resident on the MS 10, to establish an IP connection with the CD 12. In response to receiving the trigger signal, at Step C the MS 10 sends a RING to the CD 12. The CD 12 sets up the physical layer connection and at Step D a CONNECT string is sent after the physical layer is set up. At Step E the PPP negotiations occur, as was described in regard to Step E of FIG. 2, with arbitrary IP addresses being assigned. The dialer software 12D adds the PPP as an IP interface to the OS of the CD 12, as was discussed above with regard to FIG. 2, and at Step F the peer applications 10A, 12A communicate via the established IP connection.

Figure 3:
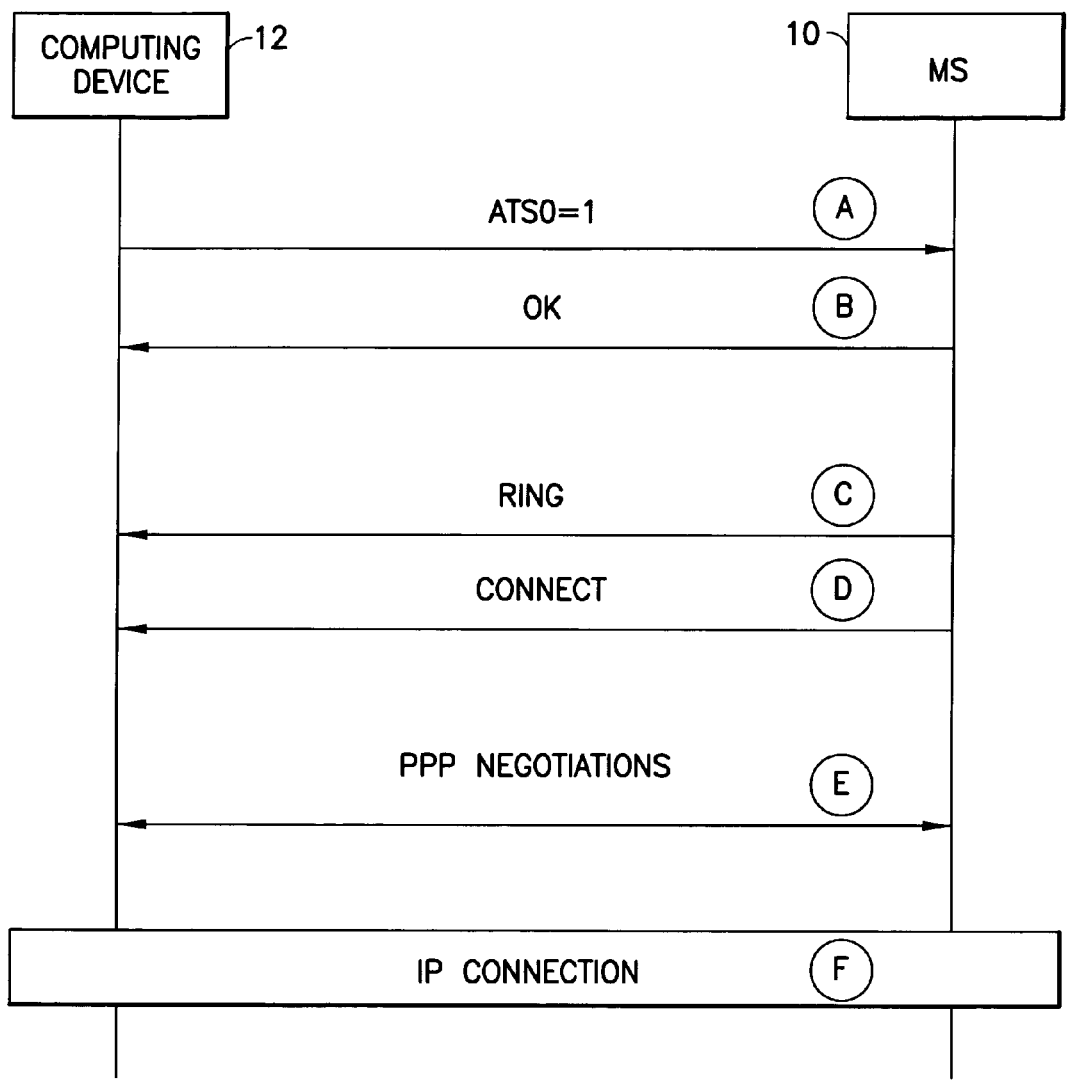
FIG. 3 illustrates message flow during a MS-initiated connection.

The operation performed by the CD 12 at Step A of FIG. 3 may be considered to essentially emulate a conventional operation where the CD 12 sets the MS 10 to the auto-answer mode when a call from an application is expected. When the call from the cellular network 14 arrives the MS 10 is then enabled to automatically answer the call, and send the RING to the CD 12. In this case the CD 12 is using the MS 10 as a modem for communicating with some remote application via the cellular network 12.

In accordance with this invention, however, the CD 12 actually initiates the connection, which in a conventional setup would be initiated by the cellular network 14. The peer application 12A communicates directly with the local peer application 10A of the MS 10 using the IP protocol 12B, 10B, and the cellular network 14 need not be involved at all.

Note that this invention is preferably software based, and no hardware changes need be made to either the MS 10 or the CD 12.

Because the cellular network 14 is not required for communications between the peer applications 10A, 12A, a savings in cellular air time usage is achieved, as is an increase in speed as the IP connectivity is available over a short-haul, lower latency interface, such as the IR/USB/Bluetooth™ interface 12C. Furthermore, standard IP-based connectivity between the CD 12 and the MS 10 can be achieved, which implies that an application written for a first MS 10 can be readily ported to a second MS 10, so long as the second MS 10 provides IP connectivity.

As can be appreciated, the use of this invention aids in migrating peer-to-peer applications to IP-based protocols. Exemplary and non-limiting applications include PIM and Synchronization. Prior to this invention, these applications were based on proprietary message exchange between the MS 10 and a vendor-specific application installed on the CD 12.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims.

As one example, similar extension can be defined for GSM/GPRS devices. Also, this invention is not limited to the use of only the value of 5 for the AT+CRM command, or to only the use of the AT+CRM command, as other values and/or types of commands might be defined to be used to place the MS 10 into the "Terminating Dial-up Mode" of operation.

Also, it should be noted that the peer-to-peer applications that can be accommodated by the use of this invention are not limited to only the above-mentioned PIM (Personal Information Management) and Synchronization applications. As non-limiting examples, other peer-to-peer applications can include, but are not limited to: File Synchronization and Backup applications, such as those that can be used for photos and video clips made by the camera 16 of the MS 10; applications that would download to the MS 10 one or more music clips that the user wishes to listen to when mobile; Parameter Provisioning applications such as those for provisioning user preferences, such as a Date/Time/Calendar format through a P2P application residing on the MS 10 and CD 12 (currently this is accomplished by using the UI (User Interface) of the MS 10); and debugging applications for debugging the MS 10 over the terminating connection. In this latter example, since IP connectivity is available between the MS 10 and the CD 12, debugger software can be run on the CD 12 which connects to a debugging agent running on the MS 10, and that can control execution of instructions on the MS 10. The debugger software can also show desired information related to the MS 10, such as the value of variables currently residing in the memory and execution stack of the MS 10.

However, all such and similar modifications of the teachings of this invention will still fall within the scope of this invention.

Furthermore, some of the features of the present invention could be used to advantage without the corresponding use of other features. For example, only the process of FIG. 2 might be implemented in a given application setting, and not the process of FIG. 3, and vice versa. As such, the foregoing description should be considered as merely illustrative of the principles of the present invention, and not in limitation thereof.

What is claimed is:

1. A method, comprising:
  receiving a command at a mobile station from a computing device over a local interface between the mobile station and the computing device, where the command places the mobile station into a mode in which a dial-up connection between the mobile station and the computing device is locally terminated at the mobile device without involving any cellular network;
  establishing an internet protocol connection between the mobile station and the computing device comprising the mobile station assigning an internet protocol address to the computing device and an internet protocol address to the mobile station, and configuring an internet protocol stack at the mobile station, where the internet protocol stack is configured to route packets received via the dial-up connection that is locally terminated at the mobile station to a peer application that is resident in the mobile station; and
  in response to receiving at the mobile station via the dial-up connection that is locally terminated at the mobile station an internet protocol message from the computing device, routing the internet protocol message received from the computing device to the peer application that is resident in the mobile station, where communications between the mobile station and the computing device occur over the internet protocol connection using the local interface and where the local interface is at least one of a short range infrared, universal serial bus, and Bluetooth interface, where the internet protocol message received from the computing device comprises a communication from a peer application resident in the computing device and where the peer application resident in the computing device and the peer application resident in the mobile station communicate directly with each other via the dial-up connection locally terminated at the mobile station using logical connections between an internet protocol stack at the computing device and the internet protocol stack at the mobile station.

2. A method as in claim 1, where the command is an AT command.

3. A method as in claim 1, where the command is an AT+CRM command.

4. A method as in claim 3, further comprising:
  sending an ATD #777 command to the mobile station from the computing device over the local interface to establish a call;
  performing peer-to-peer protocol negotiations over the local interface; and
  establishing the internet protocol connection over the local interface.

5. A method as in claim 1, where the command is an AT+CRM command having a value of five.

6. A method as in claim 1, where the command places the mobile station into an auto-answer mode.

7. A method as in claim 6, further comprising:
  in response to an occurrence of a trigger signal at the mobile station, sending a Ring signal to the computing device over the local interface to establish a call;
  performing peer-to-peer protocol negotiations over the local interface; and
  establishing the internet protocol connection over the local interface using arbitrary internet protocol addresses for the mobile station and the computing device.

8. A method as in claim 1, where the command is an ATSO=1 command.

9. A method as in claim 1, where the local interface comprises one of a wired interface and a wireless interface.

10. A computer readable memory within a mobile station embodying a computer program executable by a processor to perform actions comprising:
  receiving a command at a mobile station from a computing device over a local interface between the mobile station and the computing device, where the command places the mobile station into a mode in which a dial-up connection between the mobile station and the computing device is locally terminated at the mobile device without involving any cellular network;
  establishing an internet protocol connection between the mobile station and the computing device comprising the mobile station assigning an internet protocol address to the computing device and an internet protocol address to the mobile station, and configuring an internet protocol stack at the mobile station, where the internet protocol stack is configured to route packets received via the dial-up connection that is locally terminated at the mobile station to a peer application that is resident in the mobile station; and
  responsive to receiving at the mobile station via the dial-up connection that is locally terminated at the mobile station an internet protocol message from the computing device, routing the internet protocol message received from the computing device to the peer application that is resident in the mobile station, where communications between the mobile station and the computing device occur over the internet protocol connection using the local interface and where the local interface is at least one of a short range infrared, universal serial bus, and Bluetooth interface, where the internet protocol message received from the computing device comprises a communication from a peer application resident in the computing device and where the peer application resident in the computing device and the peer application resident in the mobile station communicate directly with each other via the dial-up connection that is locally terminated at the mobile station using logical connections between an internet protocol stack at the computing device and the internet protocol stack at the mobile station.

11. The computer readable memory embodying a computer program as in claim 10, where the command is an AT command.

12. The computer readable memory embodying a computer program as in claim 10, where the command is an AT+CRM command.

13. The computer readable memory embodying a computer program as in claim 10, where the command is an AT+CRM command having a value of five.

14. The computer readable memory embodying a computer program as in claim 10, further comprising computer program code to send an ATD #777 command to the mobile station from the computing device over the local interface to establish a call, to perform peer-to-peer protocol negotiations over the local interface and to establish the internet protocol connection over the local interface.

15. The computer readable memory embodying a computer program as in claim 10, where the command places the mobile station into an auto-answer mode.

16. The computer readable memory embodying a computer program as in claim 15, further comprising computer program code, responsive to an occurrence of a trigger signal at the mobile station, to send a Ring signal to the computing device over the local interface to establish a call, to perform peer-to-peer protocol negotiations over the local interface and to establish the internet protocol connection over the local interface using arbitrary internet protocol addresses for the mobile station and the computing device.

17. The computer readable memory embodying a computer program as in claim 10, where the command is an ATSO=1 command.

18. The computer readable memory embodying a computer program as in claim 10, where the local interface comprises one of a wired interface and a wireless interface.

19. An apparatus comprising:
at least one data processor; and
at least one memory including computer program code, where the at least one memory and the computer program code are configured, with the at least one data processor, to cause the apparatus to at least:
receive a command from a computing device over a local interface between the apparatus and the computing device, where the command places the apparatus into a mode in which a dial-up connection between the apparatus and the computing device is locally terminated at the apparatus without involving any cellular network;
establish an internet protocol connection between the apparatus and the computing device comprising assigning an internet protocol address to the computing device and an internet protocol address to the apparatus, and configuring an internet protocol stack at the apparatus, where the internet protocol stack is configured to route packets received via the dial-up connection that is locally terminated at the apparatus to a peer application that is resident in a memory of the apparatus; and
responsive to receiving at the apparatus via the dial-up connection locally terminated at the apparatus an internet protocol message from the computing device, route the internet protocol message received from the computing device to the peer application that is resident in the memory of said apparatus, where communications between the apparatus and the computing device occur over the internet protocol connection using the local interface and where the local interface is at least one of a short range infrared, universal serial bus, and Bluetooth interface, where the internet protocol message received from the computing device comprises a communication from a peer application resident in the computing device and where the peer application resident in the computing device and the peer application resident in the apparatus communicate directly with each other via the dial-up connection that is locally terminated at the mobile station using logical connections between an internet protocol stack at the computing device and the internet protocol stack at the apparatus.

20. An apparatus as in claim 19, where the command is an AT command.

21. An apparatus as in claim 19, where the command is an AT+CRM command.

22. An apparatus as in claim 19, where the command is an AT+CRM command having a value of five.

23. An apparatus as in claim 19, embodied in a mobile station and where the command places said mobile station into an auto-answer mode.

24. An apparatus as in claim 19, where the command is an ATSO=1 command.

25. An apparatus as in claim 19, where said local interface comprises at least one of a wired interface and a wireless interface, and where the assigned internet protocol addresses are assigned arbitrarily to the apparatus and to the computing device.

26. An apparatus as in claim 19, where the peer application resident in the mobile station comprises a personal information management-application.

27. An apparatus as in claim 19, where the peer application resident in the mobile station enables data to be transferred from the apparatus to the computing device for storage.

28. An apparatus as in claim 27, where the data comprises data generated by a camera of the apparatus.

29. An apparatus as in claim 19, where the peer application resident in the mobile station enables data to be transferred from the computing device to the apparatus for storage.

30. An apparatus as in claim 29, where the data comprises music data.

31. An apparatus as in claim 19, where the peer application resident in the mobile station comprises a synchronization application.

32. An apparatus as in claim 19, where the peer application resident in the mobile station comprises a parameter provisioning application.

33. An apparatus as in claim 19, where the peer application resident in the mobile station comprises a debugging application.

* * * * *